United States Patent
Kopp

(10) Patent No.: US 8,077,548 B2
(45) Date of Patent: Dec. 13, 2011

(54) MULTIBEAM SOUNDER

(75) Inventor: Laurent Kopp, Valbonne (FR)

(73) Assignee: Ixwaves Sarl (FR)

( * ) Notice: Subject to any disclaimer, the term of this patent is extended or adjusted under 35 U.S.C. 154(b) by 258 days.

(21) Appl. No.: 12/298,415

(22) PCT Filed: Apr. 26, 2007

(86) PCT No.: PCT/EP2007/054097
§ 371 (c)(1),
(2), (4) Date: Dec. 3, 2008

(87) PCT Pub. No.: WO2007/122262
PCT Pub. Date: Nov. 1, 2007

(65) Prior Publication Data
US 2009/0175127 A1    Jul. 9, 2009

(30) Foreign Application Priority Data
Apr. 26, 2006 (FR) .................................. 06 03736

(51) Int. Cl.
*G01S 15/89* (2006.01)
*H04B 11/00* (2006.01)
(52) U.S. Cl. ........................... 367/88; 367/103; 367/138
(58) Field of Classification Search .................. 367/88, 367/103, 119, 138; 343/719
See application file for complete search history.

(56) References Cited

U.S. PATENT DOCUMENTS

| 3,005,973 | A | * | 10/1961 | Kietz | 367/88 |
|---|---|---|---|---|---|
| 4,216,537 | A | * | 8/1980 | Delignieres | 367/88 |
| 4,970,700 | A | * | 11/1990 | Gilmour et al. | 367/88 |
| 5,412,618 | A | * | 5/1995 | Gilmour | 367/88 |
| 5,537,366 | A | * | 7/1996 | Gilmour | 367/88 |
| 5,602,801 | A | * | 2/1997 | Nussbaum et al. | 367/165 |
| 6,678,210 | B2 | * | 1/2004 | Rowe | 367/103 |
| 6,839,303 | B2 | * | 1/2005 | Handa et al. | 367/100 |
| 2005/0007882 | A1 | | 1/2005 | Bachelor | |

FOREIGN PATENT DOCUMENTS

| EP | 1426786 | 6/2004 |
|---|---|---|
| WO | 03081172 | 10/2003 |

* cited by examiner

*Primary Examiner* — Ian Lobo
(74) *Attorney, Agent, or Firm* — Lowe Hauptman Ham & Berner, LLP

(57) ABSTRACT

The sounder according to the invention comprises two transmit-receive antennas (1, 10) whose respective axes are off-target toward the front, in the direction of movement of the platform, these axes being symmetrical relative to a straight line (3) passing through their intersection and parallel to the axis of travel of the platform, the transmit frequency of the first antenna, equal to the receive frequency of the second being different from the transmit frequency of the second, the latter frequency being equal to the receive frequency of the first.

15 Claims, 2 Drawing Sheets

MULTIBEAM SOUNDER

CROSS-REFERENCE TO RELATED APPLICATIONS

The present Application is based on International Application No. PCT/EP2007/054097, filed on Apr. 26, 2007, which in turn corresponds to French Application No. 06 03736 filed on Apr. 26, 2006, and priority is hereby claimed under 35 USC §119 based on these applications. Each of these applications are hereby incorporated by reference in their entirety into the present application.

FIELD OF THE INVENTION

The subject of the present invention is a multibeam sounder for taking predictive submarine soundings placed on a marine or submarine platform.

BACKGROUND OF THE INVENTION

Current multibeam sounders (SMF) usually comprise a linear antenna or a 2D network of transmissive elements producing an ultrasound transmission perpendicular to the axis of the antenna, generally positioned parallel to the axis of travel of the platform. The result of this is that the sounder has no predictive capacity and can be used only for vertical or lateral sounding purposes.

SUMMARY

The subject of the present invention is a multibeam sounder making it possible to anticipate the obstacles and the centers of interest (such as fixed obstacles or shoals of fish in the case of a fishing vessel) that the platform will encounter on its route, the distance of anticipation advantageously being able to be substantially equal to the depth of water at the platform, this sounder being the most economic possible to produce, while having good resolution performance.

The sounder according to the invention comprises at least two transmit-receive antennas whose respective axes are off-target toward the front, in the direction of movement of the platform, these axes substantially forming a right angle between them and being symmetrical relative to the axis of travel of the platform, the transmit frequency of the first antenna, equal to the receive frequency of the second, being different from the transmit frequency of the second, the latter frequency being equal to the receive frequency of the first. According to one feature of the invention, these transmit and receive frequencies are as close as possible to one another while being able to be separated from one another by filtering.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The present invention will be described below with reference to a sounder comprising two linear-geometry multibeam antennas, but it is well understood that the invention is not limited solely to this example, and that it may be applied with other types of antennas, for example 2D network antennas.

Figure 1:
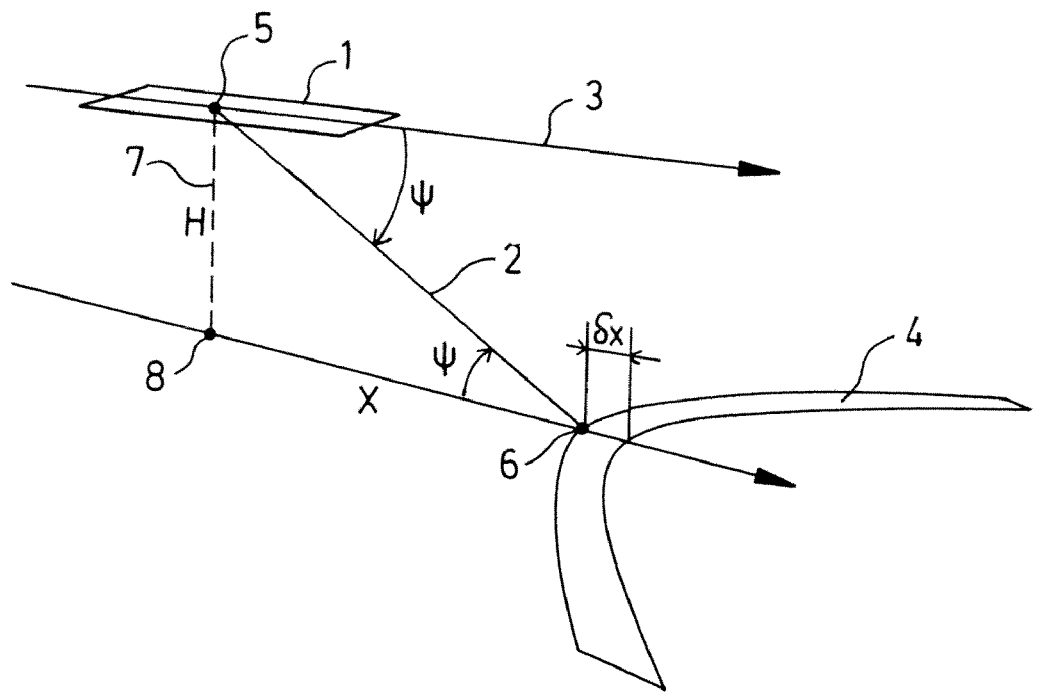
FIG. 1 is a simplified diagram illustrating various parameters relating to a single ultrasound transmit antenna off-target toward the front of its platform, according to a part of a characteristic of application of the invention.
Figure 2:
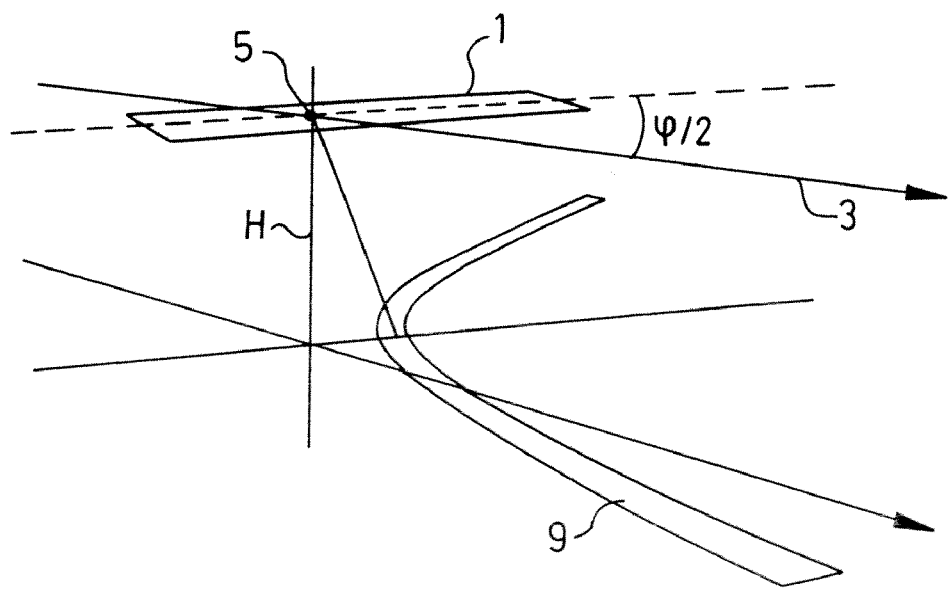
FIG. 2 is a simplified diagram illustrating various parameters relating to a single ultrasound transmit antenna that is out of alignment relative to the axis of travel of its platform, according to a part of a characteristic of application of the invention.
Figure 3:
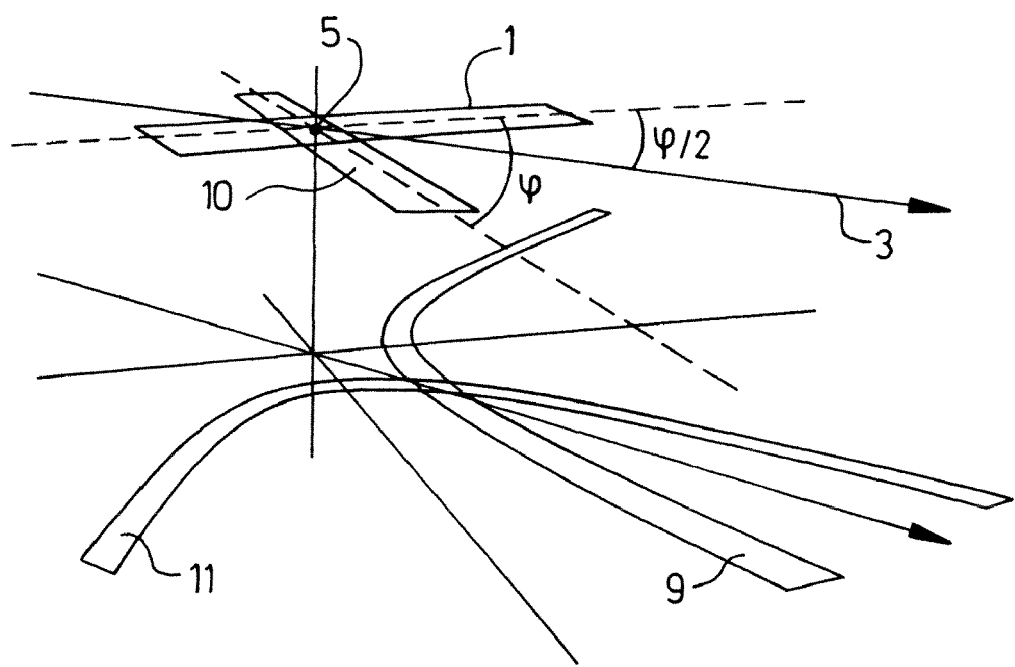
FIG. 3 is a simplified diagram illustrating the various parameters relating to a set of two ultrasound transmit antennas off-target toward the front and out of alignment relative to the axis of travel of their platform, according to the invention.

The diagrams of FIGS. 1 and 2 show a single antenna of the sounding device of the invention, namely the transmit antenna, in order to simplify the explanations, while artificially breaking down its orientation first in an off-target direction toward the front (FIG. 1), then by moving it out of line relative to the axis of travel of the platform (FIG. 2). FIG. 3 represents the two antennas of the sounder, as they must be oriented according to the invention. In these three figures, the same elements are allocated the same reference numbers.

The diagram of FIG. 1 represents a single transmit submerged antenna 1 placed at a height H above the bottom of the water, the axis of this antenna being assumed to be horizontal. The platform supporting this antenna has not been shown. The generatrix 2 of the transmit cone of the antenna 1 has been shown in its position in the vertical plane containing the axis 3 of travel of its carrying platform, which also, in this instance, is the axis of the transmit cone of the antenna 1. The angle of aperture of this transmit cone is called $\Psi$. Preferably this angle $\Psi$ is between 30° and 60° approximately. The transmit cone of this antenna 1 intersects the bottom of the water according to a geometric FIG. 4 (called "swath") of a generally hyperbolic shape (it could have a parabolic or elliptical shape depending on the value of the angle $\Psi$, that is to say, for example, depending on the pitch of the platform). The generatrix 2 of this cone starts from the center 5 of the antenna 1 (which is also the vertex of this cone) and intersects the bottom of the water at a point 6. The lowered vertical 7 of the vertex 5 cuts the bottom of the water at a point 8. The distance between the points 6 and 8 is marked x. In fact, the swath 4 has a non-zero width δx depending on the length L of the transmit antenna, the transmit grazing $\Psi$, the height H, and the wavelength λ according to the formula:

$$\delta x = \frac{\lambda}{L} \cdot \frac{H}{\sin^3 \psi}$$

This width of swath imposes limits on the speed of movement of the platform in order to ensure sampling with no gaps in the cartography, but this limit is less constraining than in the case of conventional multibeam sounders; for example, for $\Psi=45°$, it is close to 3 times less constraining.

The longitudinal resolution is defined by the formula:

$$\delta X = \frac{c}{2B} \frac{1}{\cos \Psi}$$

In a conventional multibeam sounder, the longitudinal resolution and the width of the swath are indistinguishable. In this instance, the resolution will be much better in general than the width of the swath, because it depends essentially on the B band of the transmitted signal.

The receive antenna (not shown) may be a linear antenna or a 2D network of elementary antennas whose pointing in angle of elevation is adapted to the geometry of the swath. Specifically, the waves reflected by the bottom on the receive antenna have an angle of elevation that can vary from $\theta 1$ to $\theta 2$ (relative to the horizontal plane) depending on the position of the reflector in the swath; it is therefore necessary for the aperture in angle of elevation of the receive antenna to be sufficient to prevent attenuating the acoustic waves reflected by the objects of the sounded swath, or else, for 2D networks, provision must be made to point the antenna in angle of elevation in this same range of values from $\theta 1$ to $\theta 2$. The angle $\theta 1$ is determined by the range and is typically of the order of 20° and the angle $\theta 2$ is complementary of the angle $\Psi$, that is $\theta 2 = 90° - \Psi$.

The diagram of FIG. 2 represents the same transmit antenna 1 as in FIG. 1, but out of line, in a horizontal plane passing through the center 5 of the antenna, at an angle $\phi/2$ relative to the axis 3 of travel of the platform. The swath 9 that it produces is naturally different from the swath 4, but in this instance has a substantially hyperbolic shape. The receive antenna (not shown), placed in the same horizontal plane as the antenna 1, therefore forms with the latter an angle advantageously equal to approximately 90°. This out-of-alignment of the two antennas combined with their being off-target toward the front, makes it easier to correct the disruptions of the information received by the receiving antenna, disruptions due in particular to yawing movements of the platform. It is known that the rolling, pitching and yawing movements of the platform affect the sounding properties of the transmit antenna of a conventional multibeam sounder. Pitch causes the beam to be off-target toward the front and the rear which it is possible to correct by electronic pointing. Roll has very little effect on sounding and therefore does not need to be corrected, except in the receive direction. Yaw has a very great effect and cannot be corrected in a simple manner. These comments remain valid for an off-target antenna according to the configuration of FIG. 1. But misaligning the transmit antenna relative to the route of the platform reduces the sensitivity of the sounder to yaw and increases sensitivity to roll, that is to say that it balances out the two types of error. Conversely, it is always possible to carry out electronic pointing which makes it possible to ensure the continuity of sampling toward the front, in the region that corresponds to the route of the platform. This transmit antenna configuration also makes it possible to use an ambiguous receive antenna, in order to improve the lateral resolution. The orientation of this receive antenna will then be preferably placed perpendicularly to the route of the platform. Specifically, it is then possible to increase the aperture of the receive antenna while spatially under-sampling the aperture so as not to increase the number of sensors. The network lobes of the receive antenna are not too obstructive because the misalignment of the transmit antenna, at a given moment, sounds in only one of the ambiguous directions of the receive antenna, and therefore, for one and the same number of receive channels, it is possible to manage antennas that have larger dimensions, and therefore have better resolution, which cannot be achieved with conventionally configured antennas, in which the receive antenna is perpendicular to the transmit antenna, and for which there are therefore always moments of reception for which the echoes are present in two ambiguous directions.

FIG. 3 represents, in addition to the first antenna 1 (oriented as in FIG. 2), the second antenna 10, symmetrical with the antenna 1 relative to the axis 3. As mentioned above, these two antennas form between them an angle $\Phi$ that is preferably equal to 90°. It will be noted that, if the sounder comprises more than two antennas, the angle $\Phi$ may be different from 90° and the additional antennas are advantageously receive antennas that are preferably either perpendicular to the route of the platform, or perpendicular to the two transmit antennas. In the first case, the system comprises, in addition to the two transmit antennas, a single receive antenna, optionally undersampled, as explained above. In the second case, there are two receive antennas associated with the two transmit antennas. The swath produced by the antenna 10 is referenced 11.

According to another feature of the invention, the antenna 1 transmits at a frequency f1 and receives at a frequency f2, while the antenna 10 transmits at the frequency f2 and receives at the frequency f1. The condition to be respected for these two frequencies is that they be close enough to one another in order to be able to be situated in the bandwidth of the two antennas, and that they be able to be separated spectrally by the receive devices connected to these antennas.

The value of this antenna configuration is that it combines the advantages of the off-target aiming, the out-of-alignment and causes the two antennas to operate at different transmit frequencies. These advantages are, in particular:
  the longitudinal resolution is much better than that of a simple SMF,
  the off-target aiming toward the front makes it into a navigation instrument that is suitable for providing the safety of the warship constituting the carrying platform,
  the slight grazing supplies a sounding similar to that of a lateral sonar and well suited to the topographical readings,
  the out-of-alignment makes it possible to envisage ambiguous receive antennas improving the lateral resolution,
  The double swath makes it possible to correct very simply the effects of the disruptions of attitude (roll, pitch and yaw). Specifically, the correction of the movements of the platform is necessary to provide a "gapless" coverage of the readings. The usual configuration is totally insensitive to roll; it is possible to virtually perfectly correct the effects of pitch; on the other hand it is very sensitive to yaw movements. The configuration of the invention is sensitive to the three platform rotations (roll, pitch, yaw), but the residual error after correction is smaller than in the worst case of the conventional geometry. Since transmission is ambiguous, it is not possible to correct the pointing thereof everywhere (there is no equivalence between electronic pointing and rotation) and it is therefore necessary to choose the corrected position, and it is necessary to very frequently provide several transmissions and several paintings in order to ensure the continuity of coverage. In this instance, having two antennas improves the situation. The principle of correction consists in using conventional attitude measurements (carried out with the aid of an angular station) in order to define the rotation sustained by the antenna system and impose as the direction of pointing of each antenna the nominal direction of the antenna in the absence of rotation. This makes sure that, in the front zone, the sounding is not too disrupted by the interfering rotations (naturally these effects will make themselves felt outside the front zone, but with consequences that are easier to manage). It should also be pointed out that certain manufacturers use two antennas (one on each side) in order to improve correction, but in a configuration with two transmit antennas that are parallel with one another and independent.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A multibeam sounder for taking submarine predictive soundings, placed on a marine or submarine platform, comprising:

two transmit-receive antennas, namely a first antenna and a second antenna, whose respective axes are off-target toward the front, in a direction of movement of the platform, the axes being symmetrical relative to a straight line passing through an intersection of the axes and parallel to an axis of travel of the platform, the first and second antennas being arranged to each have a transmit frequency and a receive frequency different from its transmit frequency, the transmit frequency of the first antenna being equal to the receive frequency of the second antenna, and the transmit frequency of the second antenna being equal to the receive frequency of the first antenna.

2. The sounder as claimed in claim 1, wherein the axes of the two antennas form between them an angle of approximately 90°.

3. The sounder as claimed in claim 1, wherein the transmit and receive frequencies are as close as possible to one another while being able to be separated from one another by filtering.

4. The sounder as claimed in claim 1, wherein the angle of aperture of the transmit cone of each of the antennas is between 30 and 60° approximately.

5. The sounder as claimed in claim 1, comprising two transmit antennas and one additional ambiguous receive antenna oriented perpendicularly to the route of the platform.

6. The sounder as claimed in claim 1, comprising two transmit antennas and two additional receive antennas perpendicular to the transmit antennas.

7. The sounder as claimed in claim 2, wherein the transmit and receive frequencies are as close as possible to one another while being able to be separated from one another by filtering.

8. The sounder as claimed in claim 2, wherein the angle of aperture of the transmit cone of each of the antennas is between 30 and 60° approximately.

9. The sounder as claimed in claim 3, wherein the angle of aperture of the transmit cone of each of the antennas is between 30 and 60° approximately.

10. The sounder as claimed in claim 2, comprising two transmit antennas and one additional ambiguous receive antenna oriented perpendicularly to the route of the platform.

11. The sounder as claimed in claim 3, comprising two transmit antennas and one additional ambiguous receive antenna oriented perpendicularly to the route of the platform.

12. The sounder as claimed in claim 4, comprising two transmit antennas and one additional ambiguous receive antenna oriented perpendicularly to the route of the platform.

13. The sounder as claimed in claim 2, comprising two transmit antennas and two additional receive antennas perpendicular to the transmit antennas.

14. The sounder as claimed in claim 3, comprising two transmit antennas and two additional receive antennas perpendicular to the transmit antennas.

15. The sounder as claimed in claim 4, comprising two transmit antennas and two additional receive antennas perpendicular to the transmit antennas.

* * * * *